Nov. 16, 1954  H. H. SPENGLER  2,694,272
GLASS MELTING FURNACE
Filed June 19, 1952
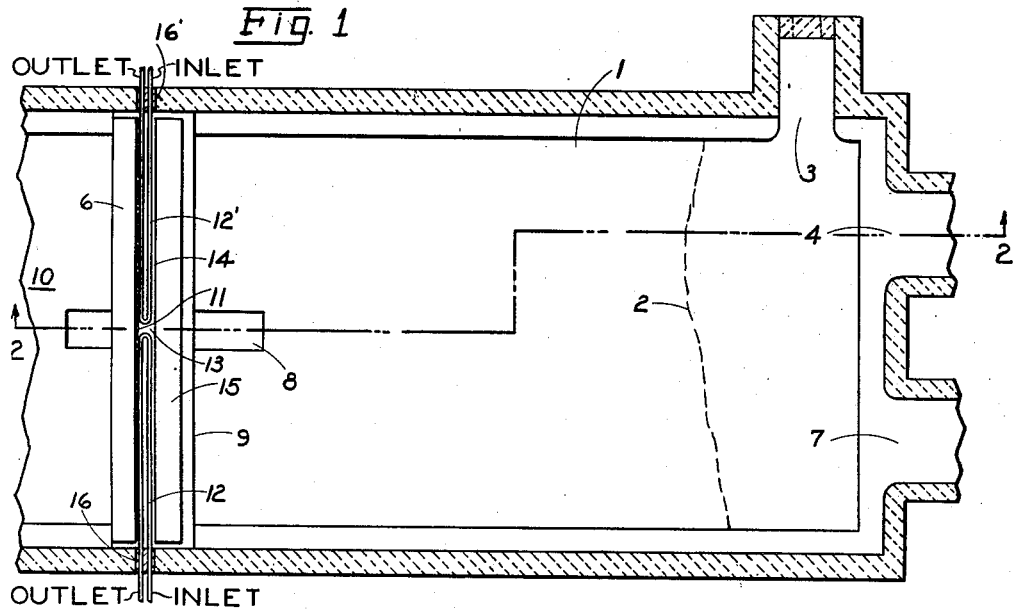
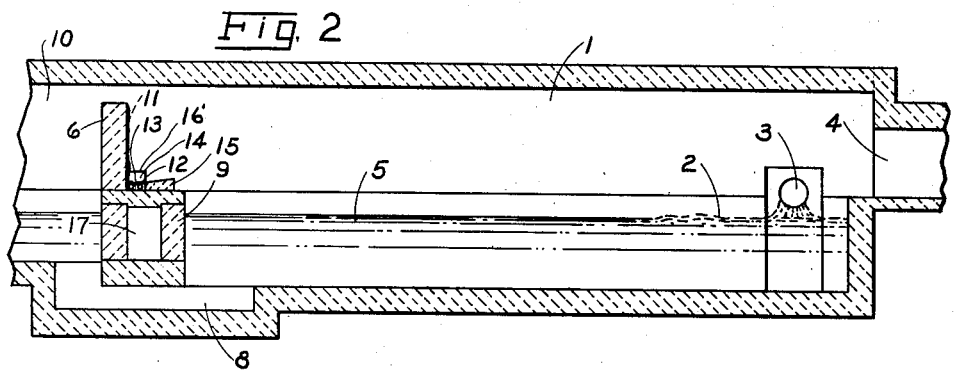
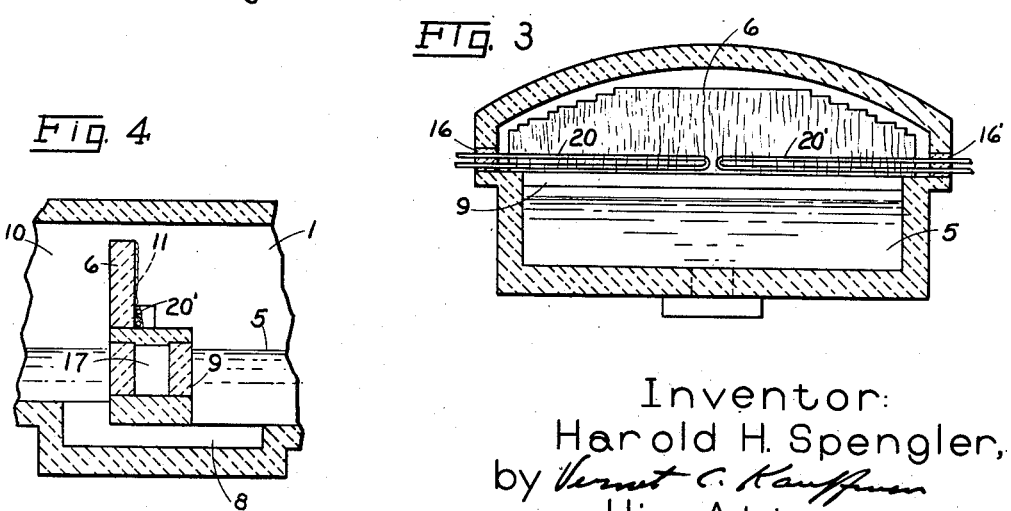
Inventor:
Harold H. Spengler,
by [signature]
His Attorney United States Patent Office 2,694,272
Patented Nov. 16, 1954

2,694,272

GLASS MELTING FURNACE

Harold H. Spengler, Cleveland Heights, Ohio, assignor to General Electric Company, a corporation of New York Application June 19, 1952, Serial No. 294,388

5 Claims. (Cl. 49—54)

My invention relates to glass melting furnaces and more particularly to furnaces having internal partitions extending across the space above the molten glass in the furnace. Such partitions include those commonly referred to as shadow walls, gates, etc., which function as dividing members within the furnace proper and which attain relatively high temperatures inasmuch as both faces thereof are exposed to the hot gases in the furnace.

In the operation of certain types of furnaces, such as the end-fired type, considerable difficulty has been experienced due to the formation of so-called knots or cords in the glass. It had been thought that the cause of excessive glass knot trouble was due to the fact that the flame, entering from the back end of the furnace and striking the powdered raw batch, carried some of the batch dust down toward the transverse bridge wall and into the front end of the tank. This "carry-over" caused a deposit in the front end on the surface of the glass which was not of the same composition as the glass melt and therefore caused cordy and knotty glass. To correct this problem it was suggested that a solid or imperforate shadow wall be incorporated in the tank above the bridge wall. However, that suggestion did not solve the problem.

It is therefore the principal object of this invention to eliminate the formation of the knots or cords.

I have discovered that the formation of the knots and cords was due to the fact that the partition or shadow wall was attacked chemically by the particles of raw batch material impinging against it and causing the formation of a viscous glass-like mass of foreign material which collected on the face of the partition and ran down into the glass. According to my invention, contamination of the glass by such foreign material is effected by cooling the vertical surface of the partition to cause the material flowing down the said surface to freeze or congeal and thereby be prevented from draining into the glass.

In accordance with one feature of my invention, the cooling of the partition is effected by placing a readily removable cooling member adjacent the lower portion of the partition and above the surface of the molten glass. The cooling member may be in the form of a water-cooled coil which causes the foreign material traveling down the wall of the partition to be congealed thereon and about the coil. The coil is preferably made to be readily removable from the tank so that it may be periodically cleaned and re-inserted in the tank.

According to a further feature of my invention, the intervals between cleaning periods of the collector member may be considerably prolonged by providing a trough along the lower edge of the partition with the cooling means located within the trough so as to collect large amounts of the contaminating material.

Still other objects and advantages of my invention will appear from the description which follows of furnace structures embodying the invention, and from the drawing.

In the drawing:

Fig. 1 is a plan view of a glass furnace portion with the cap removed, said portion comprising the bridge and shadow walls between the melting and refining chambers thereof;

Fig. 2 is a vertical section through the refining chamber of the glass furnace portion appearing in Fig. 1 and along the line 2—2 of Fig. 1.

Fig. 3 is a transverse section through the melting chamber of a glass melting furnace having modified cooling means adjacent the shadow wall thereof; and Fig. 4 is a vertical section corresponding to Fig. 2 of the portion of the modified glass melting furnace including the shadow and bridge walls thereof.

The furnace shown in Figs. 1 and 2 of the drawing provides a melting chamber 1 into which the raw glass batch 2 is introduced through the charging opening 3 in one side wall adjacent the end thereof and in which the glass batch is melted by the heat of flames and gases directed through the port 4 in the front end wall thereof. The flames and gases sweep along the surface of the raw glass 2 and the molten pool 5 thereof and along one side of the chamber 1 and finally impinge upon and are reversed by the transverse imperforate partition or shadow wall 6 which is composed of refractory brick, such as silica or alumina or combinations thereof. The returning gases sweep along the opposite side of the chamber 1 and are exhausted through the opposite port 7 in the end wall of the furnace. In a succeeding interval of operation and periodically thereafter, heating flames and gases are caused to pass through the melting chamber 1 in the reverse direction by being introduced through port 7 and by being exhausted through port 4. The melting glass batch 2 gradually settles into the molten glass 5 and advances toward and through the discharge opening 8 below the bridge wall 9 to the adjacent refining chamber 10 (only partially shown) in the furnace.

During the course of the operation of the furnace a certain amount of the powdered raw glass batch 2, which remains in the top portion of the melt until absorbed therein, is carried by the flames against the face of the shadow wall 6 and reacts chemically therewith to form a product contaminating to the glass of the melt 5. The chemical reaction is accelerated by the high temperature of the shadow wall 6 which is exposed to the hot gases in both the melting and refining chambers 1 and 10, respectively, and forms a viscous glass-like material 11 which gradually travels down the shadow wall 6. The contaminating material 11, if allowed to flow down into the molten glass 5, will form knots and cords in tubing or other products made therefrom and may, although present in a relatively small proportion, result in streaks in the tubing which will render it impossible to coat uniformly with the phosphors used in fluorescent lamps.

Provision for interrupting the flow of contamination down the face of the shadow wall 6 so as to prevent it from flowing into the molten glass 5 is provided by the metal tubes 12 and 12' which provide for the circulation of a coolant and which are located adjacent the lower extremity of the shadow wall 6 so that said extremity is cooled to congeal the contaminating material. The metal tubes 12 and 12', as herein illustrated, each comprise entering and return runs extending from one side wall of the furnace to the center thereof and are arranged so close to the shadow wall 6 and the adjacent top surface 13 of the bridge wall that the contaminating material 11 must also contact said tubes 12 and 12'. Accordingly, such contaminating material 11 collects upon tubes 12 and 12' and can be removed from the furnace along with said tubes 12 and 12', an operation which is performed periodically when appreciable contaminating material 11 has accumulated thereon.

A further advantage is provided by having the cooling tubes 12 and 12' located within a trough 14 at the lower extremity of the shadow wall 6 so that an appreciable amount of the contaminating material 11 can collect upon said tubes 12 and 12' to permit longer periods between cleaning operations. The trough 14 is defined by the top surface 13 of the bridge wall 9 which projects into the melting chamber 1 and by blocks mounted upon the ledge formed by said top surface 13 and forming a lip 15 thereacross. Readily removable blocks 16 and 16' in the side walls of the furnace permit the cooling tubes 12 and 12' to be removed with the accumulation of contaminating material 11 thereon. Although the shadow wall 6 is mounted directly upon the top surface 13 of the bridge wall 9 it receives little or no benefit of the cooling effect of air circulated through the hollow interior 17 of said bridge wall 9.

In other instances when conditions are such that less contaminating material 11 collects upon the shadow wall 6 or other furnace partition or when more cleaning operations can conveniently be provided, the cooling means of my invention may consist only of the lengths of water cooled pipes 20 and 20' appearing in the modification thereof shown in Figs. 3 and 4. In the modified apparatus both the inlet and return runs of the cooling pipes 20 and 20' are arranged in a vertical plane adjacent the face of the shadow wall 6.

It will be understood that the invention is not to be limited to the specific construction and arrangement of parts shown but that they may be widely modified within the spirit and scope of the invention as defined by the appended claims. As an example the pipes 20 and 20' may be of unequal length or they may each extend completely across the furnace from one wall to the other.

What I claim as new and desire to secure by Letters Patent of the United States is:

1. A glass melting furnace comprising walls forming an enclosure adapted to hold molten glass and providing a space over the surface of the molten glass for the circulation of heating gases, a transverse imperforate partition mounted within the enclosure and at least in part located in the space above the molten glass, an opening in said furnace adjacent one end thereof for introduction of powdered raw batch material, means to project heating flames into said furnace from said one end thereof and over the raw batch material in a direction to pick up and carry particles of the batch material against a vertical surface of said partition, and cooling means arranged adjacent a lower portion of the said vertical surface of the partition to be above the molten glass in the furnace and to freeze thereon viscous foreign matter formed on and flowing down said surface.

2. A glass melting furnace comprising walls forming an enclosure adapted to hold molten glass and providing a space over the surface of the molten glass for the circulation of heating gases, a transverse imperforate partition mounted within the enclosure and at least in part located in the space above the molten glass, an opening in said furnace adjacent one end thereof for introduction of powdered raw batch material, means to project heating flames into said furnace from said one end thereof and over the raw batch material in a direction to pick up and carry particles of the batch material against a vertical surface of said partition, and liquid cooled tube means arranged along a lower portion of the said vertical surface of the partition to be above the molten glass in the furnace and to freeze thereon viscous foreign matter formed on and flowing down said surface.

3. A glass melting furnace comprising walls forming an enclosure adapted to hold molten glass and providing a space over the surface of the molten glass for the circulation of heating gases, a transverse imperforate partition mounted within the enclosure and at least in part located in the space above the molten glass, an opening in said furnace adjacent one end thereof for introduction of powdered raw batch material, means to project heating flames into said furnace from said one end thereof and over the raw batch material in a direction to pick up and carry particles of the batch material against a vertical surface of said partition, means forming a trough across a lower portion of the partition at a point above the surface of the molten glass for collecting viscous foreign matter formed on and traveling down the said vertical surface of said partition, and liquid cooled means located within the trough for causing said foreign matter to be cooled and congeal in said trough.

4. A glass melting furnace comprising walls forming an enclosure adapted to hold molten glass and providing a space over the surface of the molten glass for the circulation of heating gases, a transverse bridge wall extending between the side walls of the enclosure and defining one side of a melting chamber therein, a shadow wall mounted upon and coextensive with the bridge wall, an opening in said furnace adjacent one end thereof for introduction of powdered raw batch material, means to project heating flames into said furnace from said one end thereof and over the raw batch material in a direction to pick up and carry particles of the batch material against a vertical surface of said shadow wall and cooling means located against a lower portion of the said vertical surface of the shadow wall within the melting chamber for freezing viscous foreign matter formed on and traveling down said shadow wall.

5. A glass melting furnace comprising walls forming an enclosure adapted to hold molten glass and providing a space over the surface of the molten glass for the circulation of heating gases, a transverse bridge wall extending between the side walls of the enclosure and defining one side of a melting chamber therein, a shadow wall mounted upon and coextensive with the bridge wall and offset toward the rear of said bridge wall so as to form a ledge at the juncture of said walls, an opening in said furnace adjacent the front end thereof for introduction of powdered raw batch material, means to project heating flames into said furnace from said front end thereof and over the raw batch material in a direction to pick up and carry particles of the batch material against a vertical surface of said shadow wall, and cooling means located upon the said ledge for freezing viscous foreign matter formed on and traveling down said shadow wall.

References Cited in the file of this patent

UNITED STATES PATENTS

| Number | Name | Date |
|---|---|---|
| 2,039,955 | Geer | May 5, 1936 |
| 2,203,288 | Willetts | June 4, 1940 |
| 2,284,348 | Tharp | May 26, 1942 |